June 28, 1955  F. M. OWEN  2,711,755
CHECK VALVE
Filed Feb. 5, 1951  3 Sheets-Sheet 1
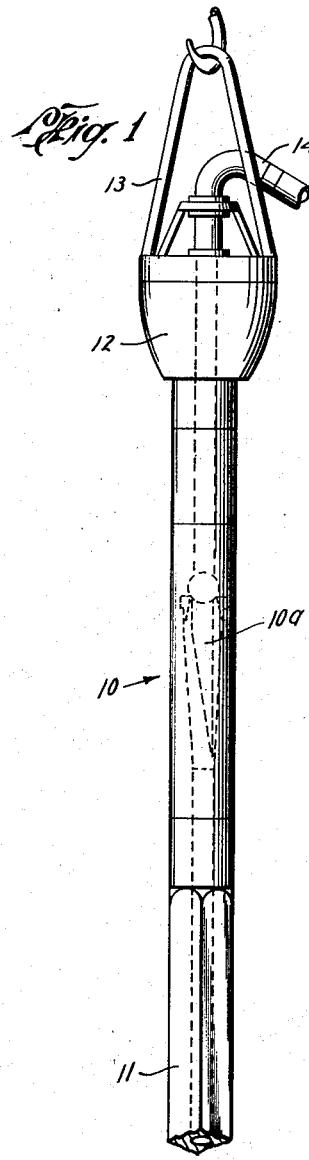
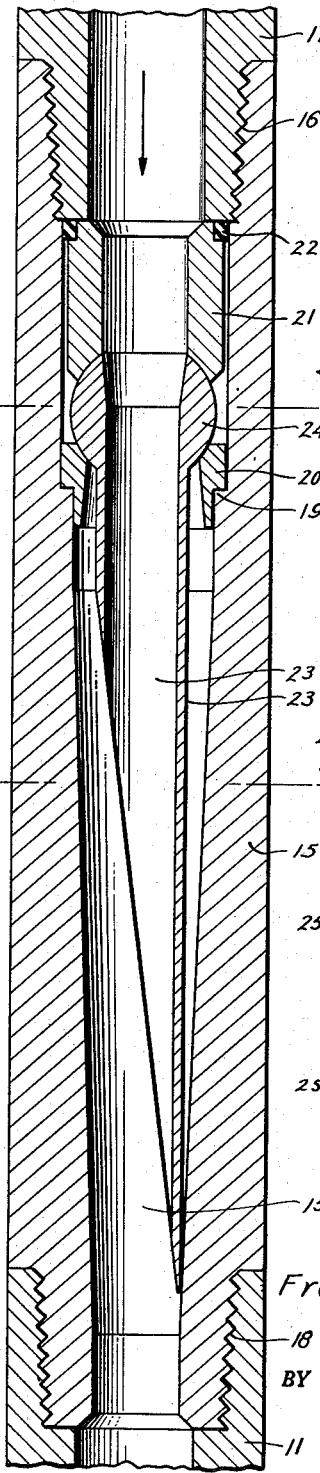
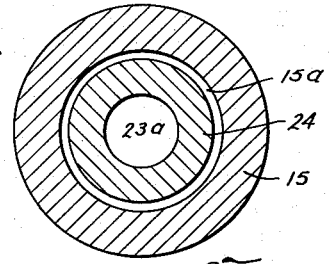
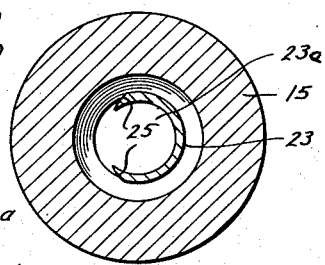
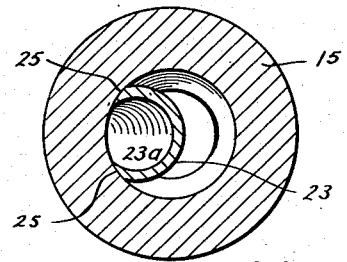
Frank M. Owen
INVENTOR.
BY Browning & Simms
ATTORNEYS

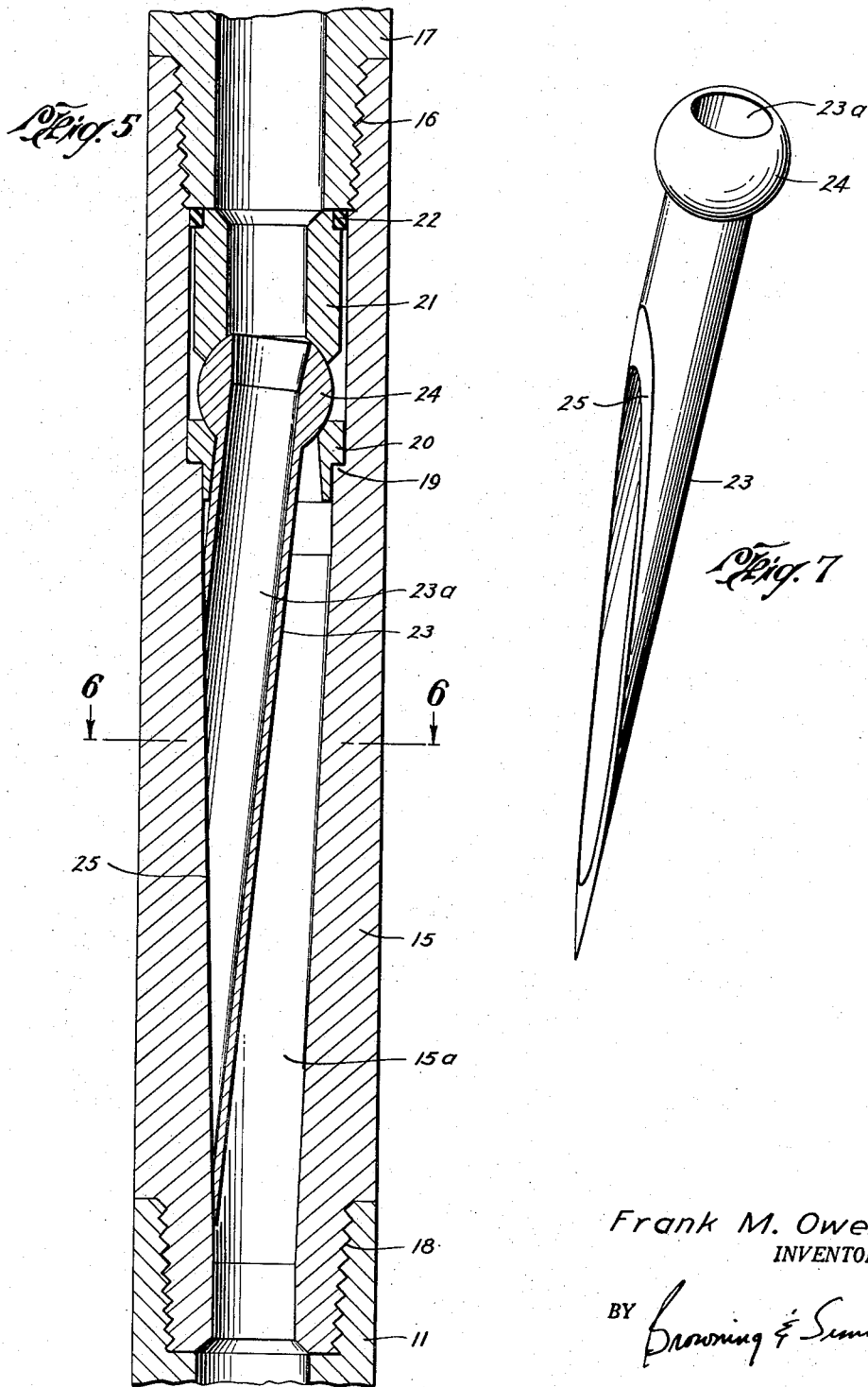

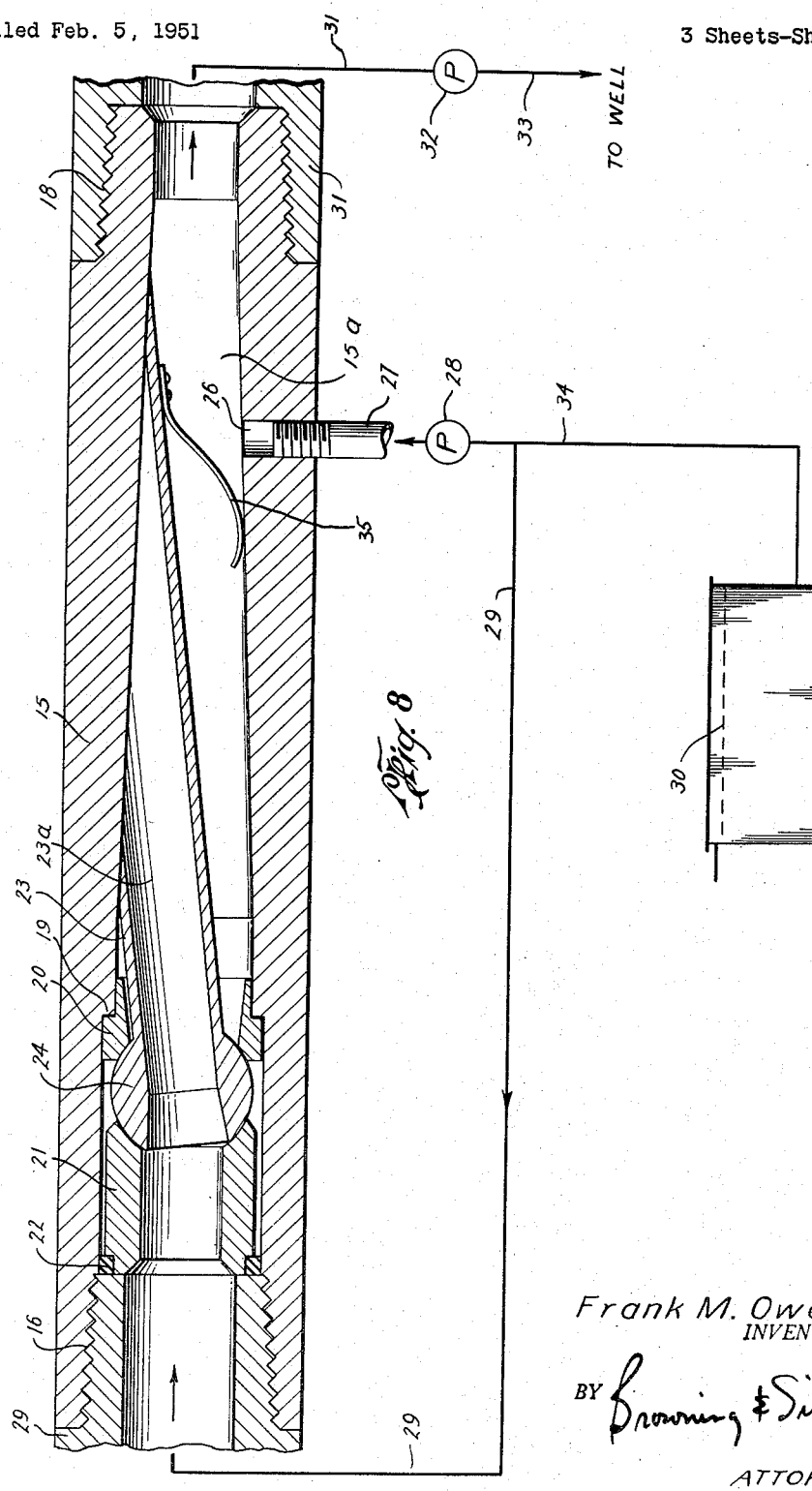

United States Patent Office 2,711,755
Patented June 28, 1955

2,711,755

CHECK VALVE

Frank M. Owen, Prescott, Ark.

Application February 5, 1951, Serial No. 209,454

16 Claims. (Cl. 137—520)

This invention relates to a check valve. In one of its aspects it relates to a check valve having an oscillatable closure means adapted to seat against the wall or housing of said valve. In another of its aspects, this invention relates to a valve closure means adapted to be seated against one wall of said valve to limit fluid flow therethrough.

It is common to provide a conduit which carries a fluid with a check valve to prevent reversal of flow of fluid in said conduit. Many of the different types of check valves now in use employ an imperforate circular clapper or closure means adapted to seat against a check valve body and across the line of flow when such reversal of flow occurs. Very often, particularly when handling fluids containing cementitious materials, such clapper or closure means will become stuck in a closed position so that upon reversal of flow it provides an effective barrier for the normal flow of fluid. Further, when the pressure developed by the fluid during any attempted reverse flow against the closure means of such type valves is excessive, the closure means often becomes jammed in its seat and cannot be reopened upon reversal of flow but must be removed and replaced. Also in such clapper type check valves, a large pressure drop will exist therethrough during normal flow which limits the economy of their usage. It is obvious that it would be highly desirable to possess a check valve which would not be injured or would not become ineffective because of excessive back pressures thereagainst and which would be particularly adapted to handle flows of fluid with a minimum of pressure drop therethrough.

Accordingly, it is an object of this invention to provide a check valve which can effectively prevent reversal of flow even under large pressures and yet which can readily be placed in an unseated condition when the normal flow is resumed.

Another object of this invention is to provide a check valve which will have a low fluid pressure drop therethrough.

Still another object of this invention is to provide a check valve which is particularly adapted to handle a flow of fluid containing cementitious and/or other interfering substances and which can be readily opened despite the sticking tendency of such fluids.

Still another object of this invention is to provide a valve having an oscillating closure means therein which is adapted to seat against one wall of the valve housing in such a manner as to prevent reversal of fluid flow through said valve and yet to become readily unseated upon resumption of normal flow.

Yet another object of this invention is to provide a valve closure means adapted to oscillate about a point along its length and to have one end seated against a wall of a valve housing when it is desired to limit flow through said valve.

Other objects, advantages and features of this invention will be readily apparent to one skilled in the art upon a consideration of the written specification taken in conjunction with the attached drawings wherein:

Fig. 1 represents one application of the valve of this invention for preventing reversal of fluid flow through a kelly in a well drilling apparatus;

Fig. 2 represents a cross-sectional view of a preferred embodiment of the valve of this invention, the valve being in open position;

Figs. 3 and 4 represent cross-sectional views on the lines 3—3 and 4—4 of Fig. 2, respectively;

Fig. 5 represents another cross-sectional view similar to that of Fig. 2 except that the valve is shown in closed position;

Fig. 6 represents a cross-sectional view taken on the lines 6—6 of Fig. 5;

Fig. 7 represents a preferred embodiment of the closure means of this invention.

Fig. 8 represents another embodiment of the apparatus of this invention with particular reference to an illustrative advantageous use thereof.

In the drawings, like characters of reference designate corresponding parts throughout the several views.

Referring now to Fig. 1, the valve of this invention is designated generally by the numeral 10 and the closure means by 10a. A kelly 11 is attached to one end of the valve and is adapted to be received through a turntable of an ordinary rotary drilling rig. At the other end of the valve is attached a conventional swivel 12 adapted to permit the kelly 11 to turn without turning the bail 13 attached to the swivel. Gooseneck 14 is connected to the swivel in such a manner that a fluid, such as a drilling mud, can be passed therethrough, into and through valve 10 and thence downwardly through the drill string.

Referring now to Figs. 2 to 7 inclusive, there is shown a valve housing means which can be an elongated valve body 15 having a longitudinal opening 15a therethrough of circular cross-section. This opening or passageway can have a gradually decreasing diameter in the downward direction as shown in the drawings. One end of valve body 15 can be interiorly threaded as at 16 to receive a threaded portion of a conduit 17. The other end of the valve housing can be threaded as at 18 to be screwed into one end of kelly 11.

At a point along the length of valve housing 15, a shoulder 19 can be provided to receive in sealable relationship an element 20 of a transversely split ball and socket joint. A second element 21 of the ball and socket joint can be seated against the end of conduit 17, as shown, with a seal ring 22 being received in one end therein so as to form a fluidtight seal between the element 21, valve body 15 and conduit 17.

The valve closure means of this invention can comprise a length of conduit or valve member 23. Means are provided for mounting the valve member so as to permit it to oscillate or swing toward a seat on the valve body and such means can comprise a ball 24 adapted to be received between elements 20 and 21 to form a ball and socket joint. A longitudinal passageway 23a is provided through conduit 23 and ball 24. Thus, there is provided a valve member and means for mounting the same so that it can swing laterally of its longitudinal axis.

Member 20 of the ball and socket joint is preferably made of a wear-resistant metal such as bronze. Ball 24 is preferably spherically along its outer surface and the coinciding surfaces of members 20 and 21 are likewise spherical and have a radius equal to that of the spherical surface of the ball.

One end of the closure means is cut in such a manner and is so shaped that when the valve member is oscillated about ball 24, longitudinal passageway 23a through conduit 23 will be closed by seating against one wall of valve body 15, as shown in Fig. 5. It will be noted from Fig. 4 that the leading edge 25 of conduit 23 will be cut in an arc having, at any one point, a radius equal to the radius of the longitudinal passageway 15a through valve body 15 at such point. Thus, the radius of curvature of leading edge 25 will vary from point to point along the longitudinal axis of valve body 15 in accordance with the radius of passageway 15a existing at any particular point so that a close fit can be achieved between the valve closure member and a wall of the valve body 15, as shown in Fig. 6. The angle "A" between the cut end of the closure member and the longitudinal axis thereof should not exceed 45°, and preferably is of the order of 10° to 30°.

The valve of this invention is assembled as shown in the drawings with member 21 being seated against ball 24 of the closure means which in turn is seated against member 20. The amount of pressure exerted by members 21 and 20 against ball 24 should be sufficient to prevent any substantial leakage therebetween but should not be so great as to prevent the valve member from freely oscillating about ball 24. In fact, when the valve body is disposed in a horizontal position in such a manner that the leading edge 25 of conduit 23 seats against the lowermost portion of the interior of valve body 15, the amount of pressure exerted by members 21 and 20 against ball 24 may be sufficiently small that conduit 23 will, under its own weight, assume a normally closed position with respect to the interior of a portion of the wall of valve body 15 when no flow of fluid is occurring through the valve. It should be noted that even when members 20 and 21 exert a very slight pressure against ball 24, a reversal of fluid flow through the valve will cause the ball 24 to push member 21 tightly against the abutting end of conduit 17 in such a manner that packing 22 will be expanded and so that the ball 24 will assume a tight sealing relationship with the corresponding surface of member 21 thereby preventing any leakage of fluid occurring during the reversal of flow.

When fluid flow is in the direction of the arrow shown in Fig. 2, i. e., through conduit 17, element 21, ball 24, conduit 23 and kelly 11, the closure means of this invention will be maintained in the position shown in that figure and fluid can readily flow therethrough. However, if the fluid flow should be reversed from the direction of the arrow shown in Fig. 2, conduit 23 will be forced by the reversed fluid pressure against the wall of valve body 15 to the position shown in Fig. 5 thereby effectively preventing flow through the valve in such reverse direction. Upon resumption of flow of fluid in its normal direction, i. e., in the direction of the arrow in Fig. 2, the conduit 23 will be forced from its sealing relation with the wall of the valve body 15 as shown in Fig. 5 to the opened position shown in Fig. 2, thereby again permitting flow to occur through the valve.

Referring now to Fig. 8, there is shown in cross-sectional view a valve similar to that illustrated in Figs. 2 and 5, and having parts of similar function numbered the same as the corresponding parts of the valve illustrated in Figs. 2 and 5. In addition, there is provided a means for introducing fluid into the valve body in such a manner that the pressure exerted by said fluid will cause the closure means contained in said valve body to become seated in a closed position to prevent flow of fluid through the valve in a reverse direction from that of the normal fluid flow therethrough. With such provision the valve becomes particularly adapted for use as an automatic compounding valve for compounding pumps, i. e., placing two or more pumps in series flow so that the discharge of one pump becomes the suction of another pump as will be described more fully hereinafter. Referring now more particularly to Fig. 8, a passageway 26 is provided through valve body 15 at a point downstream to normal flow through the entrance to passageway 23a in conduit 23. Passageway 26 may be adapted to receive in threaded relationship a conduit 27 of a suitable size to handle the discharge of fluid from pump 28. The inlet end of valve body 15 is threaded at 16 to receive a correspondingly threaded end of a conduit 29, which conduit may extend to take suction from a mud pit or other fluid source 30. The discharge end of the valve body 15 is threaded at 18 to receive a correspondingly threaded portion 31 of an end of a conduit which can be extended to lead to the suction side of pump 32. The discharge side of pump 32 can be connected by means of conduit 33 to the point at which the pump fluid is to be delivered such as the inlet to a well being drilled. The suction side of pump 28 is connected by means of conduit 34 to a source of fluid such as mud pit 30.

The operation of the valve per se illustrated in Fig. 8 is substantially the same as that described for the valve shown in Figs. 2 and 5, in that fluid flowing into the inlet end of the valve will pass through element 21, passageway 23a and thence out the open end of conduit 23 which will be unseated from this position on a portion of the wall of valve body 15. Should the fluid attempt to reverse its direction of flow through the valve body, i. e., attempt to flow from the outlet end through the conduit 23 in a direction opposite from that just described for normal flow, such flow will cause the conduit 23 to become seated against a portion of the wall of valve body 15 so that conduit 23 will assume a position shown in Fig. 8, whereby flow of fluid in a reverse direction through the valve is substantially stopped.

When it is desired to use the valve illustrated in Fig. 8 as the compounding valve, the piping connections shown in Fig. 8 are made. During normal operation pump 32 will be the only pump moving a fluid from its source 30 to the well while pump 28 is shut down. Hence, flow will be from fluid source 30 through a line 29 through the interior of the valve including conduit 23 and thence out through conduit 31 to the suction side of pump 32. The fluid is then discharged from pump 32 through line 33 and can be passed to a well or other desired point. Then when it is desired to increase the pressure in conduit 33, the pump can be compounded merely by starting pump 28. After this pump has begun operation, fluid will be drawn through line 34 and discharged through line 27, passageway 26 and thence into the interior of valve body 15, i. e., into passageway 15a. The resultant pressure in passageway 15a will cause conduit 23 to become seated against a portion of the wall of valve body 15 thereby preventing any flow from occurring in a direction opposite to that of the arrow shown in Fig. 8. Fluid will flow through the valve body and effluent line 31, to the suction of pump 32 where the pressure will again be boosted and thereby permit the fluid to be passed through conduit 33 to the well at a high pressure. When it is desired to cease compounding the pumps, it is only necessary that pump 28 be shut down whereupon the fluid from the mud pit 30 will assume its normal flow through conduit 29 and through the interior passageway 23a of conduit 23.

It is obvious from the foregoing that the provision of the valve of this invention in the manner illustrated in Fig. 8 will permit ready compounding of two or more pumps, and that the only operation necessary to place a pump in a compounding position or remove it therefrom is to start and stop that pump. In this manner, the use of the valve of this invention eliminates the necessity for opening and closing a multitude of valves, which is the normal procedure in compounding one pump with another through a manifold. Also, compound through the use of a valve of this invention will permit one to apply in a sudden manner the necessary increased pressure on the well. When a deep well, for example, is being drilled with a heavy mud and it is desired to suddenly increase the pressure on the formation through increased mud pressure, or to suddenly increase the rate of circulation of the mud, it is highly desirable to compound the pumps without shutting down the normal flow of the mud inasmuch as any cessation of flow will permit, in many instances, settling out from the mud and freezing of the drill stem.

Although the valve of this invention can be used in any position, e. g., vertical, horizontal, inclined or inverted, without providing any means for urging or biasing the conduit 23 to a closed position with respect to the wall of valve body 15 other than the normal reverse flow of fluid therethrough, it may at times be desirable to provide a means for biasing the valve closure means to a closed position. Such means can comprise a spring such as leaf spring 35 attached to the wall of conduit 23 opposite the discharge opening therein and adapted to bear against the wall of valve body 15 in the manner shown in Fig. 8. The provision of such biasing means may be particularly desirable when the valve body is disposed in a horizontal position with the conduit 23 having its discharge opening and leading edge 25 looking upwardly. When employing such spring the closure means will be normally biased to a closed position and will be opened by the normal flow of fluid. When such fluid flow ceases, the closure means will be biased to a closed position and any reverse flow of fluid will act to further supplement the force of the biasing means to cause the closure means to assume an even tighter seat against the wall of the valve body 15.

It is to be noted that when the valve closure member is constructed in accordance with this invention, an effective seating pressure can be exerted thereagainst upon reversal of flow. The pressure of the fluid attempting to flow in the reversed direction will be applied to the closure means over an area equivalent to that bounded by the internal periphery of the angularly cut end of conduit 23. Thus, a large force can be provided to seat the valve closure member in position against the wall of the valve body. When the normal flow of fluid has been resumed, the valve can be readily unseated to permit such flow. It will be noted that a very large force can be exerted to unseat the valve inasmuch as the fluid pressure of the normally flowing fluid will be exerted against the wall of the valve closure means opposite the opening in the end thereof through the acute angle existing between the wall of valve body 15 and the longitudinal axis of conduit 23. Thus, the area over which the fluid pressure of the normally flowing fluid is applied is much greater than the lateral cross-sectional area of conduit 23. It is by this effective multiplication of seating area that the valve closure means is able to be seated so effectively against the wall of the valve body and yet to be readily disengaged therefrom upon resumption of normal flow.

Another important advantage to be derived from the valve of this invention is that there is provided a plurality of available seating areas for the closure means. Thus, should the interior wall of the valve body 15 become worn or corroded at the area where the closure means has theretofore been normally seating, as will commonly occur when the valve is handling an erosive fluid, a new seating surface can be provided by merely rotating the closure means about its longitudinal axis through an angle sufficient to provide a different portion of the interior wall of the valve body to act as a new seating surface for the closure means to seat against. Such rotation can be resorted to, from time to time, to provide several successive seating surfaces, at least four and possibly six or seven, without renewing valve body 15.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A check valve which comprises, in combination, a valve body having an inner wall and a fluid-conducting closure means adapted to oscillate laterally of its longitudinal axis upon reversal of flow through the valve to seat against said inner wall, said closure means having a surface exposed to fluid within said valve body such that the closure means, when seated, is urged towards its seat on said inner wall.

2. A check valve which comprises, in combination, a valve body having an inner wall and an opening for fluid flow, and a closure means mounted in said valve body to oscillate laterally of its longitudinal axis upon reversal of flow through the valve to seat one of its ends against said inner wall, said closure means having a surface exposed to fluid within said valve body such that the closure means, when seated, is urged towards its seat on said inner wall.

3. A check valve which comprises, in combination, a valve body adapted to conduct flow therethrough, a closure means having a fluid passage therethrough forming a part of a fluid passage through the valve and being mounted at one of its ends in said body to permit the other end to oscillate therein, said other end being formed with a seat surface surrounding the fluid passage through the closure means so that it can seat against a portion of the wall of said body upon reversal of flow through the valve to limit flow through said valve, said closure means providing a pressure surface facing oppositely from said seat surface and in communication with a fluid passage in the valve downstream of the seat.

4. A check valve which comprises, in combination, an elongate valve body having a passageway longitudinally therethrough of circular cross-section, an elongated closure means having a passageway along its longitudinal axis whereby fluid can flow through said valve, means for permitting said closure means to oscillate one of its ends and forming a substantial seal between the other end and said valve body, said one end being shaped to seat against said body when in contact therewith, said closure means having an external lateral surface exposed to fluid pressure within the valve body and situated to urge the closure means to seated position upon reversal of flow through said valve.

5. The apparatus of claim 4 wherein said means permitting oscillation is a ball and socket type joint connecting said closure means to said body.

6. A check valve which comprises, in combination, an elongated valve body having a longitudinal passageway of circular cross-section, an elongated valve member having a passageway along its longitudinal axis whereby fluid can flow through said valve, a ball and socket type joint receivable in said valve body and connected to said valve member whereby one end of said valve member can oscillate thereabout, the oscillating end of said valve member being so formed that when said oscillating end is swung against a wall of said valve body the passageway through said closure means is effectively blocked by said wall, the closure means extending into said passageway in said valve body with an effective portion of its lateral external wall surface exposed to fluid in said passageway to urge the closure means, upon reversal of fluid flow through the valve, to seated position.

7. The apparatus of claim 6 wherein said end of said valve member is cut at an angle from the longitudinal axis of said valve member not exceeding 45°.

8. A check valve closure means which comprises, in combination, an elongated conduit, a ball attached to one end of said conduit and adapted to be received in a socket therefor, the other end of said conduit being cut at an angle less than 45° from the longitudinal axis of said conduit and being so shaped as to seat in seating relationship with a surface.

9. A check valve which comprises, in combination, an elongated valve body having a longitudinal passageway of circular cross-section, an elongated closure means having a passageway along its longitudinal axis and extending into said longitudinal passageway whereby fluid can flow through said valve, a ball and socket type joint mounting said closure means in said valve body so that said closure means can oscillate at one end, the oscillating end of said closure means being so formed that when it is swung against a portion of one wall of said valve body, said oscillatable end will seat thereagainst to effectively block flow of fluid through said valve, said closure means having an external effective pressure surface disposed so that upon reversal of flow through said valve, the closure means will be urged to seated position.

10. The apparatus of claim 9 in combination with a means for introducing fluid into the interior of said valve body at a point intermediate the ball and socket type joint and the discharge end of said valve.

11. The apparatus of claim 10 in combination with a means for biasing said closure means to a closed position with respect to said portion of the wall of said valve body.

12. A check valve which comprises, in combination, a valve body, a valve member within the body and having a flow passage therethrough, said body having inlet and outlet passages respectively, in communication with said passage through said valve member so that said inlet, outlet and valve member passages together constitute a flow passageway through the valve, the valve member having an end formed with a seat surface surrounding the passage in the valve member and adapted to seat against the valve body to block flow through the valve member, means mounting the valve member to permit said end to swing toward and away from its seating position with said body, said valve member having an external surface facing oppositely from said seat surface so that upon reversal of fluid flow through the valve, fluid pressure against such oppositely facing surface urges the valve member toward seated position, said outlet passage in the valve body extending to be in fluid communication with said oppositely facing surface.

13. The valve of claim 12 wherein the seat surface end of said valve member is disposed at an angle with the longitudinal axis of the flow passage through the valve member.

14. A check valve which comprises, in combination, a valve body adapted to conduct flow therethrough, an elongate closure means situated in said body and having a longitudinal passage therethrough for conducting flow through a portion of said body, said closure means being mounted in said body for oscillation of an end thereof against a portion of the periphery of the interior of said body, said end having a seat surface surrounding the passage in the closure means and disposed at an angle with the longitudinal axis of said closure means so as to seat against said portion of said body, said closure means providing an effective pressure surface which faces oppositely from said seat surface and which is exposed to fluid within the valve body downstream of said seat surface whereby the pressure of said fluid acts thereagainst upon reversal of flow through said valve to urge the closure means to seated position to thereby cause flow to cease through the valve.

15. A check valve which comprises, in combination, a valve body having a passage for conducting flow therethrough, an elongated closure means adapted to conduct through itself at least a portion of the flow through said body and mounted in said body to permit one end thereof to swing against an inner wall of said body, said one end being cut at an angle with the longitudinal axis of said closure means and formed to seat against said inner wall of said body when swung thereagainst to limit flow through said valve, said closure means also having an external lateral surface against which fluid pressure is applied upon reversal of flow through the valve to urge said one end toward said inner wall, said external surface being in communication with that portion of said passage in the valve body which is downstream of said seat.

16. A check valve which comprises, in combination, a valve body having a fluid inlet and outlet, closure means in said body having a fluid passage therethrough communicating between said inlet and outlet thereby forming a part of the fluid passageway through the valve, said closure means also having an enlarged head, means in said body receiving said head in such a manner as to permit an end of said closure means to swing laterally, said end being formed to seat with an inner wall of said body upon laterally swinging said one end, said closure means having an effective lateral surface in fluid communication with said outlet so that upon reversal of flow through the valve, fluid pressure is applied to said surface to swing said end laterally to seat with said inner wall and block flow through the valve.

References Cited in the file of this patent

UNITED STATES PATENTS

| | | |
|---|---|---|
| 182,355 | Campbell | Sept. 19, 1876 |
| 385,292 | Baltzley | June 26, 1888 |
| 639,576 | Hurlbut | Dec. 19, 1899 |
| 1,698,961 | Mueller | Jan. 15, 1929 |
| 2,433,405 | Stamm | Dec. 30, 1947 |